United States Patent
Kenney et al.

(10) Patent No.: US 10,090,964 B2
(45) Date of Patent: Oct. 2, 2018

(54) APPARATUS, COMPUTER READABLE MEDIUM, AND METHOD FOR AN INTERLEAVER FOR HIGHER QUADRATURE AMPLITUDE MODULATION (QAM) IN A HIGH EFFICIENCY WIRELESS LOCAL-AREA NETWORK

(71) Applicant: Intel IP Corporation, Santa Clara, CA (US)

(72) Inventors: Thomas J. Kenney, Portland, OR (US); Mohamed K. Hassanin, SunnyVale, CA (US); Shahrnaz Azizi, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 156 days.

(21) Appl. No.: 14/861,566

(22) Filed: Sep. 22, 2015

(65) Prior Publication Data
US 2016/0323130 A1     Nov. 3, 2016

Related U.S. Application Data

(60) Provisional application No. 62/153,630, filed on Apr. 28, 2015.

(51) Int. Cl.
*H04W 84/12*     (2009.01)
*H04L 1/00*     (2006.01)
(Continued)

(52) U.S. Cl.
CPC ......... *H04L 1/0009* (2013.01); *H04B 7/0452* (2013.01); *H04L 1/0003* (2013.01);
(Continued)

(58) Field of Classification Search
CPC ............. H04L 27/2637; H04L 27/3405; H04L 1/0071; H04W 84/12
See application file for complete search history.

(56) References Cited

U.S. PATENT DOCUMENTS 8,044,832 B1 * 10/2011 Zhang ............... H03M 13/2707
                                                       341/51
8,995,573 B1 * 3/2015 Aharony ............. H04L 27/3411
                                                       375/298
(Continued)

FOREIGN PATENT DOCUMENTS

KR     1020060072573 A     6/2006
WO     WO-2016175911 A1     11/2016

OTHER PUBLICATIONS

"International Application Serial No. PCT/US2016/019529, International Search Report dated Jul. 8, 2016", 3 pgs.
(Continued)

*Primary Examiner* — Andrew Chriss
*Assistant Examiner* — Voster Preval
(74) *Attorney, Agent, or Firm* — Schwegman Lundberg & Woessner, P.A.

(57) ABSTRACT

A high-efficiency wireless local-area network (HEW) device including physical layer and medium access control layer circuitry is disclosed. The physical layer and medium access control layer circuitry may be configured to encode data with a binary convolutional code (BCC) to generate encoded data, and interleave the encoded data in accordance with one of a plurality of interleaver configurations for one of a predetermined number of data subcarriers to generate interleaved encoded data. The physical layer and medium access control layer circuitry may be further configured to map the interleaved encoded data with a quadrature amplitude modulation (QAM) greater than 256 QAM onto longer-duration orthogonal frequency division multiplexed (OFDM) sym-
(Continued)

bols, and transmit the longer-duration OFDM symbols on channel resources in accordance with an orthogonal frequency division multiple access (OFDMA) technique. The channel resources may be resource allocations with each resource allocation including the one of the predetermined number of data subcarriers.

13 Claims, 7 Drawing Sheets

(51) Int. Cl.
  *H04B 7/0452* (2017.01)
  *H04L 5/00* (2006.01)
  *H04L 27/00* (2006.01)
  *H04L 27/26* (2006.01)
  *H04L 27/36* (2006.01)

(52) U.S. Cl.
  CPC .......... *H04L 1/0071* (2013.01); *H04L 5/0046* (2013.01); *H04L 27/0008* (2013.01); *H04L 27/2602* (2013.01); *H04L 27/2634* (2013.01); *H04W 84/12* (2013.01); *H04L 27/36* (2013.01)

(56) References Cited

U.S. PATENT DOCUMENTS

| | | |
|---|---|---|
| 2006/0107171 A1 | 5/2006 | Skraparlis |
| 2009/0257454 A1 | 10/2009 | Maltsev et al. |
| 2011/0116359 A1 | 5/2011 | Li et al. |
| 2014/0140360 A1 | 5/2014 | Nikopour et al. |
| 2014/0205029 A1* | 7/2014 | Srinivasa ............ H04L 1/0016 375/260 |
| 2014/0294111 A1* | 10/2014 | Zhang ................. H04B 7/0417 375/267 |
| 2015/0295745 A1* | 10/2015 | Prodan ............... H04L 27/2637 375/260 |
| 2016/0094318 A1* | 3/2016 | Shattil .................. H04B 7/026 375/267 |
| 2017/0272295 A1* | 9/2017 | Lee .................... H04L 27/2608 |

OTHER PUBLICATIONS

"International Application Serial No. PCT/US2016/019529, Written Opinion dated Jul. 8, 2016", 4 pgs.

* cited by examiner

```
QAM1024 = [-31 -29 -25 -27 -17 -19 -23 -21 -1 -3 -7 -5 -15 -13 -9 -11 ...
           31  29  25  27  17  19  23  21  1  3  7  5  15  13  9  11 ...];

for i=0:1023
    Vec = de2bi(i,10);  % Binary vector that is the input to the modulator
    realindex = 16 * Vec(1) + 8* Vec(2) + 4 * Vec(3) + 2*Vec(4) + 1*Vec(5) + 1;
    imagindex = 16 * Vec(6) + 8* Vec(7) + 4 * Vec(8) + 2*Vec(9) + 1*Vec(10) + 1;
    symbolq = (QAM1024(realindex) +1j *QAM1024(imagindex)) ;
    scatter(real(symbolq),imag(symbolq));
    hold on;
%    pause(0.050);
end
```

% I value index of the QAM symbol
% Q value index of the QAM symbol

% I + Q values corresponding to binary input Vec

APPARATUS, COMPUTER READABLE MEDIUM, AND METHOD FOR AN INTERLEAVER FOR HIGHER QUADRATURE AMPLITUDE MODULATION (QAM) IN A HIGH EFFICIENCY WIRELESS LOCAL-AREA NETWORK

PRIORITY CLAIM

This application claims the benefit of priority under 35 USC 119(e) to U.S. Provisional Patent Application Ser. No. 62/153,630, filed Apr. 28, 2015, which is incorporated herein by reference in its entirety.

TECHNICAL FIELD

Embodiments relate to wireless devices. Some embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to using 1024 quadrature amplitude modulation (QAM) in a wireless local area network (WLAN). Some embodiments relate to interleavers and/or coding rates for binary convolution codes (BCC). Some embodiments relate to a signal constellation of the proposed 1024 QAM.

BACKGROUND

Efficient use of the resources of a wireless local-area network (WLAN) is important to provide bandwidth and acceptable response times to the users of the WLAN. Moreover, wireless devices may need to operate with both newer protocols and with legacy device protocols.

Additionally, there may be errors in receiving data, and different ways of transmitting the data over the wireless medium may reduce the number of errors or may provide the receiver with additional information that may enable the receiver to correct errors.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
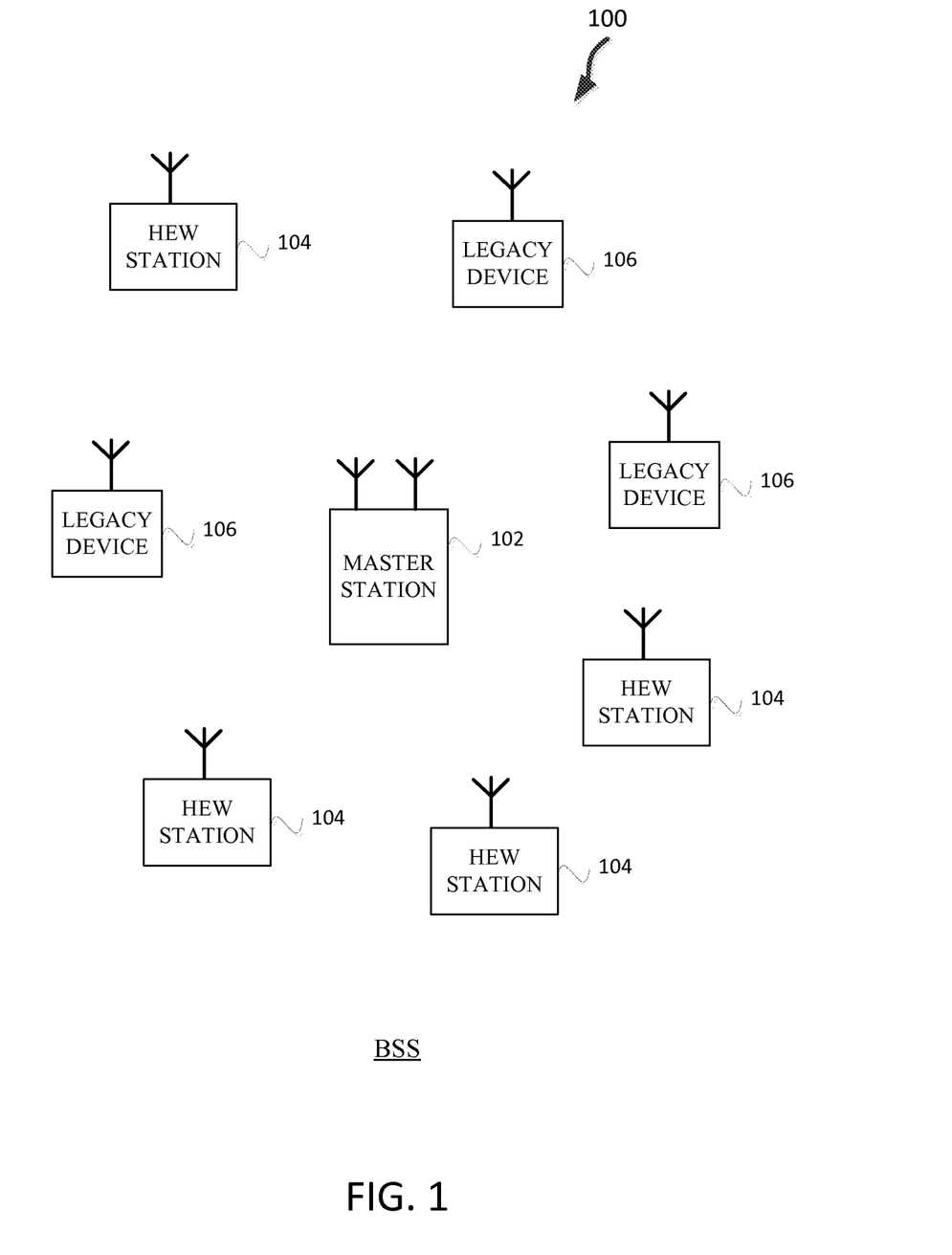
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-7.

Figure 2:
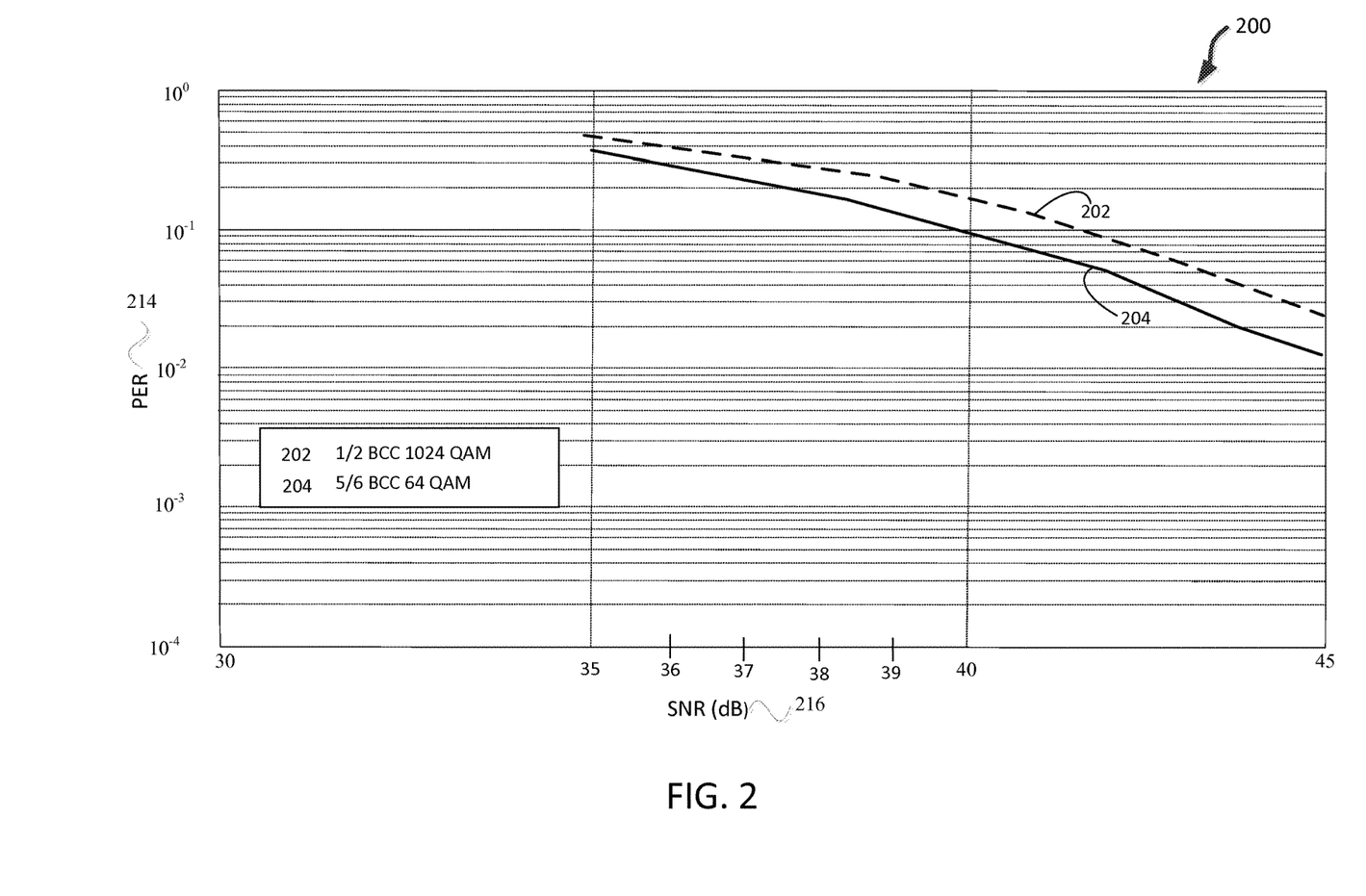
FIG. 2 illustrates the results of a simulation comparing 1024 QAM modulation with ½ channel code to 64 QAM with ⅚ channel code in accordance with some embodiments.

FIG. 2 illustrates the results 200 of a simulation comparing 1024 QAM modulation with ½ channel code to 64 QAM with ⅚ channel code in accordance with some embodiments. The simulation was run with a spectral efficiency of five bits per second per hertz with a 20 MHz channel. The simulation was further run with very-high throughput packets, spatial streams (ss) equal to 260 megabits per second (Mbps), and with impairments including power amplifier non-linearity, frequency offset, and phase noise. Illustrated in FIG. 2 are packet error rate (PER) 214 along a vertical axis, signal to noise ratio (SNR) 216 along a horizontal axis, ½ binary convolution coding (BCC) 1024 QAM 202 and ⅚ BCC 64 QAM 204. The fraction at the beginning ½ or ⅚ indicates a channel code where the first number is the information and the second number is total number of bits. For example, ⅚ indicates that for every 6 bits in a code word that 5 bits is for actual information and 1 bit is for error detection coding.

A comparison is made between 1024 QAM and 64 QAM where the channel code is adjusted so both will yield the same effective code rate. 1024 QAM modulation with a ½ channel code and 64 QAM with a channel code ⅚ yield the same effective code rate with both having log (1024) *0.5=log (64)*⅚, which is equal to 5 bits per second per Hertz. So, ½ BCC 1024 QAM 202 and ⅚ BCC 64 QAM 204 have the same effective code rate.

The performance of ½ BCC 1024 QAM 202 is about 1 dB worse than ⅚ BCC 64 QAM 204. For example, ½ BCC 1024 QAM 202 crosses the $10^{-1}$ (0.1) PER 214 line at about 41 dB SNR 216, and ⅚ BCC 64 QAM 204 crosses the 0.1 PER 214 line at about 40 dB SNR 216, so ⅚ BCC 64 QAM 204 performs a little bit better than ½ BCC 1024 QAM 202.

Figure 3:
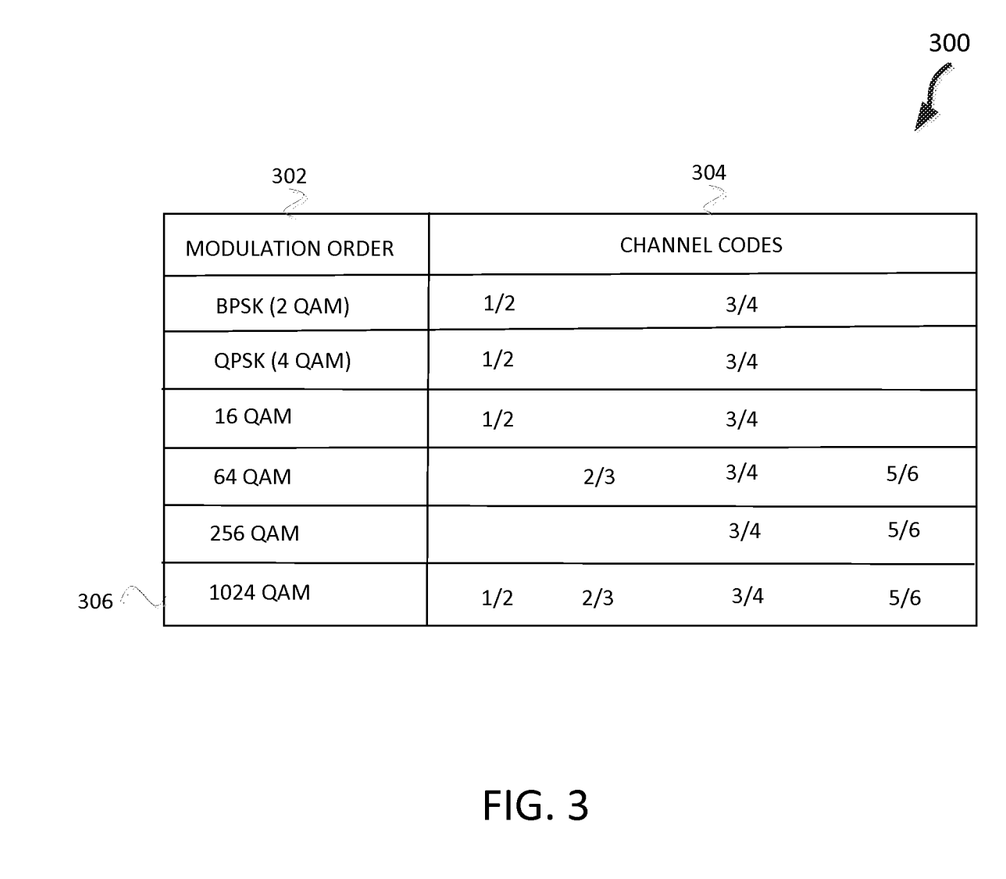
FIG. 3 illustrates a table of modulation orders with channel codes 404 used for the modulation orders in accordance with some embodiments.

FIG. 3 illustrates table 1 300 of modulation orders 302 with channel codes 304 used for the modulation orders in accordance with some embodiments. Illustrated in FIG. 3 are modulation orders 302 with the channel codes 304 that may be included in standards. In some legacy standards, lower channel codes are not included in some of the higher modulation orders. For example, ½ channel code is not included with 64 QAM in IEEE 802.11ac. In some embodiments the master station 102 and/or HEW station 104 may be configured to transmit with a modulation order of 1024 QAM and channel codes of ½ and ⅔ as disclosed in row 306 of table 1 300. As disclosed in conjunction with FIG. 2, a lower channel code such as ½ may provide similar performance than lower modulation orders with higher channel codes. For example, as disclosed in the simulation results 200, a modulation order of 1024 QAM with a channel code of ½ may perform similarly as a modulation order of 64 QAM with a channel code of ⅚.

Figure 4:
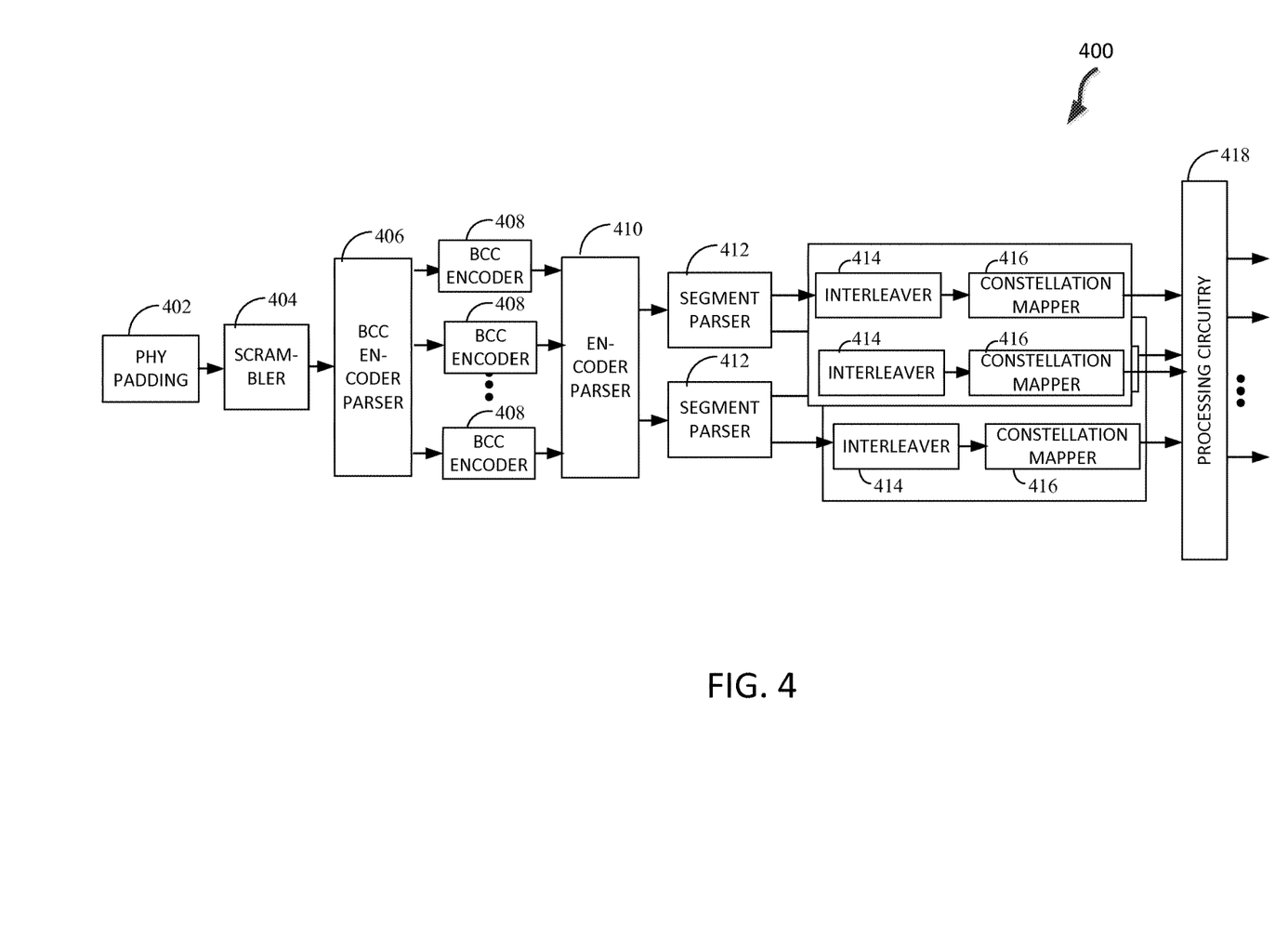
FIG. 4 is a partial physical-layer block diagram of an HEW device 400 in accordance with some embodiments.

FIG. 4 is a partial physical-layer block diagram of an HEW device 400 in accordance with some embodiments. The HEW device 400 may be a master station 102 or a HEW STA 104. The PHY layer circuitry 400 may be suitable for use as a portion of the physical layer of an HEW communication station, such as master station 102 (FIG. 1) and/or HEW device 104 (FIG. 1). As illustrated in FIG. 4, the PHY layer circuitry 400 includes, among other things, PHY padding 402, a scrambler 404, BCC encoder parser 406, one or more encoders 408, encoder parser 410, a segment parsers 412, one or more interleavers 414, one or more constellation mappers 416, and processing circuitry 418.

The PHY padding 402 may add or remove bits to ensure that the number of bits that are transmitted match a number of bits required for a symbol. The scrambler 404 may be configured to reduce the probability of many bits with the same value, which may improve the performance of the BCC encoders 408. The BCC encoder parser may be configured to divide the stream of bits among different spatial streams. The BCC encoders 408 may be configured to perform BCC encoding on a stream of bits from the BCC encoder parser 406. The one or more segment parsers 412 may be configured to parse bit streams from the encoder parser 410 based on subchannels.

Each BCC interleaver 414 may be configured to interleave a block of encoded data in accordance with any one of the plurality of BCC interleaver configurations. The BCC interleaver configurations may include a number of rows and a number of columns. In some embodiments, the PHY circuitry 1304 includes the block interleaver 414. Each block interleaver 414 may have a depth of one OFDM symbol, the block interleaver may be configured to interleave a block of encoded data based on an interleaver configuration. The interleaver configuration may include a number of columns and a number of rows. In some embodiments the interleaver may operate in accordance with Equation (1) for a first permutation and operate in accordance with Equation (2) for a second permutation.

$$i = N_{ROW} * (k \bmod N_{COL}) + \text{floor}\left(\frac{K}{N_{COL}}\right). \quad \text{Equation (1)}$$

Where $1 \leq i_{SS} \leq N_{SS}$, $k=0, 1, \ldots, N_{CBPSS}-1$, $N_{CBPSS}$ is the number of coded bits per spatial stream, $N_{SS}$ is the number of spatial streams, and $i_{SS}$ is current spatial stream. For some subchannel bandwidths $N_{CBPSS}$ may be divided into segments.

$$j = s * \text{floor}\left(\frac{k}{s}\right) + \left(k + N_{CBPSS} - \text{floor}\left(\frac{N_{COL}*k}{N_{CBPSS}}\right)\right) \bmod s. \quad \text{Equation (2)}$$

Where $1 \leq i_{SS} \leq N_{SS}$, $k=0, 1, \ldots, N_{CBPSS}-1$, and s is a block size of the segment parser 412. In some embodiments, the interleaver 414 may perform a third permutation if there is more than one spatial stream.

Each of the constellation mappers 416 may be configured to map interleaved data to a constellation (e.g., a quadrature amplitude modulation (QAM) constellation) after interleaving.

An FFT may be performed by the processing circuitry 418 on the constellation-mapped symbols provided by the constellation mappers to generate time-domain signals for transmission by one or more antennas.

In accordance with embodiments, the BCC encoders 408 and constellation mappers 416 operate in accordance with one of a plurality of predetermined modulation and coding scheme (MCS) combinations for the particular subcarrier allocation (i.e., the tone allocation). For example, as disclosed in conjunction with FIG. 3, the predetermined MCS combinations and subcarrier allocations that may be used include modulation orders of BPSK (2QAM), QPSK (4 QAM), 16 QAM, 64 QAM, 256 QAM, 1024 QAM, and coding rates of ½, ¾, ⅔ and ⅚.

In some of these embodiments, prior to interleaving, the HEW device 400 may be configured to encode the input data based on a coding rate and subsequent to the interleaving and may be configured to constellation map interleaved bits to QAM constellation points based on a modulation level. The coding rate and modulation level may be in accordance with one of the predetermined MCS combinations for the particular subcarrier allocation.

In some embodiments, each resource allocation unit may be configurable for communication of between one and four spatial streams, although the scope of the embodiments is not limited in this respect. In these embodiments, an SDMA or MIMO technique may be used during the control period to communicate the spatial streams. In some embodiments, each resource allocation unit may be configurable for communication of up to eight or more spatial streams, Some embodiments disclosed herein provide a number of data subcarriers, number of pilot subcarriers, and the size of block interleaver for the case of BCC encoding.

In accordance with some embodiments, a HEW device 400 may be configured to communicate longer-duration OFDM symbols on channel resources in accordance with an OFDMA technique. The channel resources may comprise one or more resource allocation units and each resource allocation unit may comprise a predetermined number of data subcarriers. In some embodiments, the HEW communication station may configure the resource allocation units in accordance with one of a plurality of subcarrier allocations for one of a plurality of interleaver configurations for communication of the longer-duration OFDM symbols. In these embodiments, the longer-duration OFDM symbols may have a symbol duration that is four-times as long (4×) as a standard OFDM symbol duration. The standard-duration OFDM symbols may have a symbol duration that ranges from 3.6 micro-seconds (μs) including a 400 nanosecond (ns) short guard interval to 4 μs including an 800 ns guard interval.

Tables 2 through 7 illustrate possible interleaver sizes for OFDMA tone allocation sizes for IEEE 802.11ax for BCC in accordance with some embodiments. Table 2 illustrates possible interleaver sizes for a single user with non-OFDMA in an 80 MHz sub-channel in accordance with some embodiments.

TABLE 2

| NRows | NCols | Nsd |
|---|---|---|
| 2 | 41 | 984 |
| 3 | 41 | 984 |
| 4 | 41 | 984 |
| 6 | 41 | 984 |
| 8 | 41 | 984 |
| 12 | 41 | 984 |
| 24 | 41 | 984 |
| 2 | 82 | 984 |
| 3 | 82 | 984 |
| 4 | 82 | 984 |
| 6 | 82 | 984 |
| 12 | 82 | 984 |
| 2 | 123 | 984 |
| 4 | 123 | 984 |
| 8 | 123 | 984 |
| 2 | 164 | 984 |
| 3 | 164 | 984 |
| 6 | 164 | 984 |
| 2 | 246 | 984 |
| 4 | 246 | 984 |
| 3 | 328 | 984 |
| 2 | 492 | 984 |

Illustrated in table 2 are number of interleaver row sizes (NRows), a number of interleaver columns sizes (NCols) for a given number of data sub-carriers (Nsd). The interleavers with NCols of 41 and 82 columns are determined to provide better performance based on a simulation similar to the simulation disclosed in FIG. 2.

Table 3 illustrates possible interleaver sizes for an OFDMA allocation with 52 sub-carriers in accordance with some embodiments. Illustrated in table 3 are a number of interleaver row sizes (NRows), a number of interleaver columns sizes (NCols) for a given number of data sub-carriers (Nsd). The interleavers with NCols of 12 and 16 columns are determined to provide better performance based on a simulation similar to the simulation disclosed in FIG. 2.

TABLE 3

| NRows | NCols | Nsd |
|---|---|---|
| 2 | 2 | 48 |
| 3 | 2 | 48 |
| 4 | 2 | 48 |
| 6 | 2 | 48 |
| 8 | 2 | 48 |
| 12 | 2 | 48 |
| 2 | 3 | 48 |
| 4 | 3 | 48 |
| 8 | 3 | 48 |
| 2 | 4 | 48 |
| 3 | 4 | 48 |
| 2 | 24 | 48 |
| 4 | 4 | 48 |
| 6 | 4 | 48 |
| 12 | 4 | 48 |
| 2 | 6 | 48 |
| 4 | 6 | 48 |
| 8 | 6 | 48 |
| 2 | 8 | 48 |
| 3 | 8 | 48 |
| 6 | 8 | 48 |
| 2 | 12 | 48 |
| 4 | 12 | 48 |
| 3 | 16 | 48 |

Table 4 illustrates possible interleaver sizes for an OFDMA allocation with 26 sub-carriers in accordance with some embodiments. Illustrated in table 4 are a number of interleaver row sizes (NRows), a number of interleaver columns sizes (NCols) for a given number of data sub-carriers (Nsd). The interleavers with NCols of 8 columns is determined to provide better performance based on a simulation similar to the simulation disclosed in FIG. 2.

TABLE 4

| NRows | NCols | Nsd |
|---|---|---|
| 2 | 2 | 24 |
| 3 | 2 | 24 |
| 4 | 2 | 24 |
| 6 | 2 | 24 |
| 12 | 2 | 24 |
| 2 | 3 | 24 |
| 4 | 3 | 24 |
| 8 | 3 | 24 |
| 2 | 4 | 24 |
| 3 | 4 | 24 |
| 6 | 4 | 24 |
| 2 | 6 | 24 |
| 4 | 6 | 24 |
| 3 | 8 | 24 |
| 2 | 12 | 24 |

Table 5 illustrates possible interleaver sizes for an OFDMA allocation with 102 sub-carriers in accordance with some embodiments. Illustrated in table 5 are a number of interleaver row sizes (NRows), a number of interleaver columns sizes (NCols) for a given number of data sub-carriers (Nsd). The interleavers with NCols of 17 columns is determined to provide better performance based on a simulation similar to the simulation disclosed in FIG. 2.

TABLE 5

| NRows | NCols | Nsd |
|---|---|---|
| 3 | 2 | 102 |
| 2 | 3 | 102 |
| 2 | 17 | 102 |
| 3 | 17 | 102 |
| 6 | 17 | 102 |
| 3 | 34 | 102 |
| 2 | 51 | 102 |

Table 6 illustrates possible interleaver sizes for an OFDMA allocation with 484 sub-carriers in accordance with some embodiments. Illustrated in table 6 are a number of interleaver row sizes (NRows), a number of interleaver columns sizes (NCols) for a given number of data sub-carriers (Nsd). The interleavers with NCols of 26, 36, 52 columns are determined to provide better performance based on a simulation similar to the simulation disclosed in FIG. 2.

TABLE 6

| NRows | NCols | Nsd |
|---|---|---|
| 2 | 2 | 468 |
| 3 | 2 | 468 |
| 6 | 2 | 468 |
| 9 | 2 | 468 |
| 13 | 2 | 468 |
| 18 | 2 | 468 |
| 2 | 3 | 468 |
| 3 | 3 | 468 |
| 4 | 3 | 468 |
| 6 | 3 | 468 |
| 12 | 3 | 468 |
| 13 | 3 | 468 |
| 3 | 4 | 468 |
| 9 | 4 | 468 |
| 13 | 4 | 468 |
| 2 | 6 | 468 |
| 3 | 6 | 468 |
| 6 | 6 | 468 |
| 13 | 6 | 468 |
| 2 | 9 | 468 |
| 4 | 9 | 468 |
| 13 | 9 | 468 |
| 3 | 12 | 468 |
| 13 | 12 | 468 |
| 2 | 13 | 468 |
| 3 | 13 | 468 |
| 4 | 13 | 468 |
| 6 | 13 | 468 |
| 9 | 13 | 468 |
| 12 | 13 | 468 |
| 18 | 13 | 468 |
| 2 | 18 | 468 |
| 13 | 18 | 468 |
| 2 | 26 | 468 |
| 3 | 26 | 468 |
| 6 | 26 | 468 |
| 9 | 26 | 468 |
| 18 | 26 | 468 |
| 13 | 36 | 468 |
| 2 | 39 | 468 |
| 3 | 39 | 468 |
| 4 | 39 | 468 |
| 6 | 39 | 468 |
| 12 | 39 | 468 |
| 3 | 52 | 468 |
| 9 | 52 | 468 |
| 2 | 78 | 468 |
| 3 | 78 | 468 |
| 6 | 78 | 468 |
| 2 | 117 | 468 |

TABLE 6-continued

| NRows | NCols | Nsd |
|---|---|---|
| 4 | 117 | 468 |
| 3 | 156 | 468 |
| 2 | 234 | 468 |

Table 7 illustrates possible interleaver sizes for an OFDMA allocation with 484 sub-carriers excluding channel code ⅞ in accordance with some embodiments. Illustrated in table 7 are a number of interleaver row sizes (NRows), a number of interleaver columns sizes (NCols) for a given number of data sub-carriers (Nsd). The interleavers with NCols of 79 columns are determined to provide better performance based on a simulation similar to the simulation disclosed in FIG. 2.

In some embodiments the master station 102 and/or HEW STA 104 may be configured to select a column size based on a number of tones and/or based on a channel coding. For example, for 484 sub-carriers or tones and a channel code ⅞, the master station 102 and/or HEW device 104 may select interleavers with 79 columns.

TABLE 7

| NRows | NCols | Nsd |
|---|---|---|
| 2 | 2 | 468 |
| 3 | 2 | 468 |
| 6 | 2 | 468 |
| 9 | 2 | 468 |
| 13 | 2 | 468 |
| 18 | 2 | 468 |
| 2 | 3 | 468 |
| 3 | 3 | 468 |
| 4 | 3 | 468 |
| 6 | 3 | 468 |
| 12 | 3 | 468 |
| 13 | 3 | 468 |
| 3 | 4 | 468 |
| 9 | 4 | 468 |
| 13 | 4 | 468 |
| 2 | 6 | 468 |
| 3 | 6 | 468 |
| 6 | 6 | 468 |
| 13 | 6 | 468 |
| 2 | 9 | 468 |
| 4 | 9 | 468 |
| 13 | 9 | 468 |
| 3 | 12 | 468 |
| 13 | 12 | 468 |
| 2 | 13 | 468 |
| 3 | 13 | 468 |
| 4 | 13 | 468 |
| 6 | 13 | 468 |
| 9 | 13 | 468 |
| 12 | 13 | 468 |
| 18 | 13 | 468 |
| 2 | 18 | 468 |
| 13 | 18 | 468 |
| 2 | 26 | 468 |
| 3 | 26 | 468 |
| 6 | 26 | 468 |
| 9 | 26 | 468 |
| 18 | 26 | 468 |
| 13 | 36 | 468 |
| 2 | 39 | 468 |
| 3 | 39 | 468 |
| 4 | 39 | 468 |
| 6 | 39 | 468 |
| 12 | 39 | 468 |
| 3 | 52 | 468 |
| 9 | 52 | 468 |
| 2 | 78 | 468 |
| 3 | 78 | 468 |
| 6 | 78 | 468 |

TABLE 7-continued

| NRows | NCols | Nsd |
|---|---|---|
| 2 | 117 | 468 |
| 4 | 117 | 468 |
| 3 | 156 | 468 |
| 2 | 234 | 468 |
| 3 | 2 | 474 |
| 2 | 3 | 474 |
| 2 | 79 | 474 |
| 3 | 79 | 474 |
| 6 | 79 | 474 |
| 3 | 158 | 474 |

Figure 5:
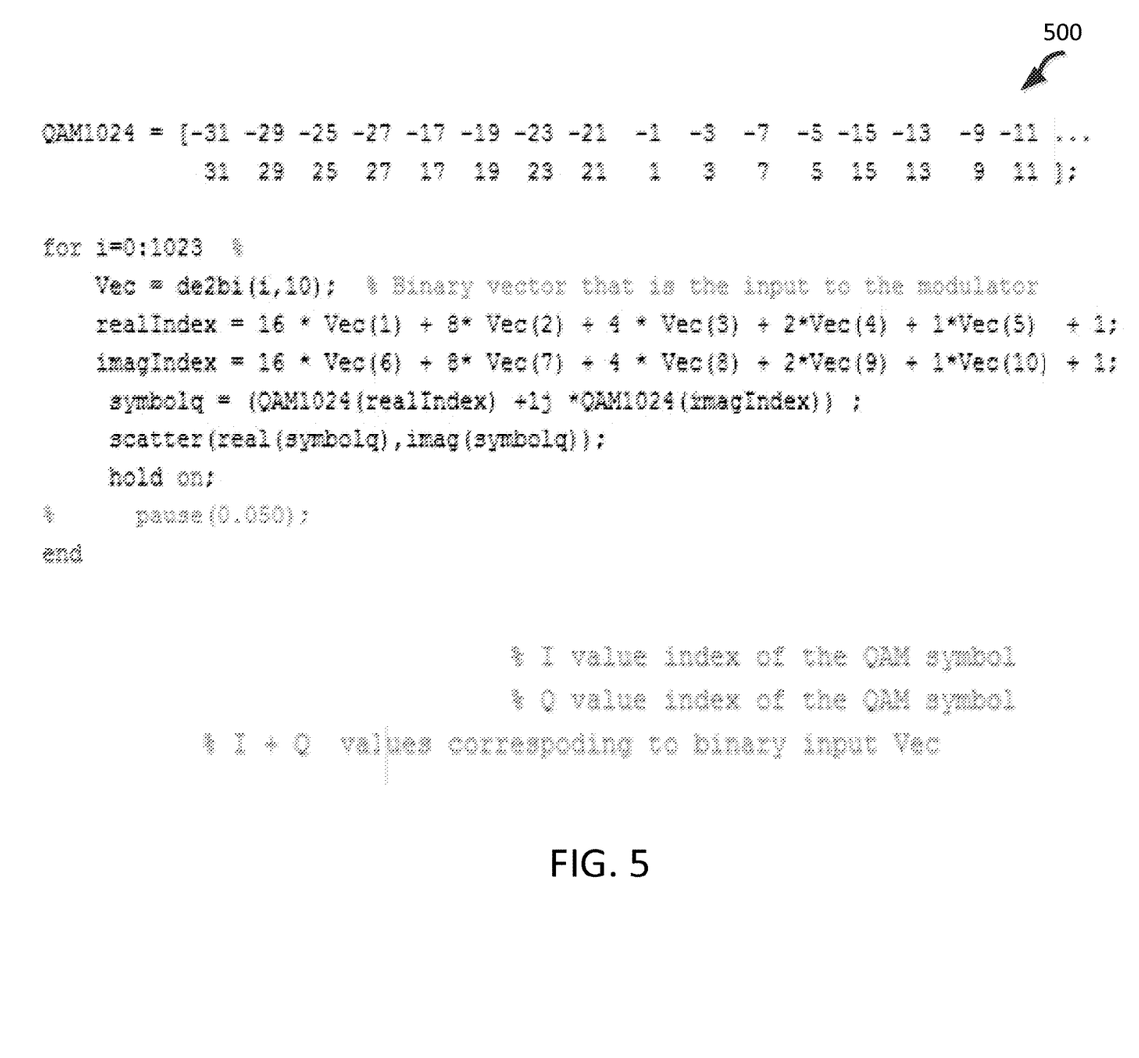
FIG. 5 illustrates a script to generate the signal constellation of the proposed 1024 QAM in accordance with some embodiments.

FIG. 5 illustrates a script 500 to generate the signal constellation of the proposed 1024 QAM in accordance with some embodiments. The script 500 may be a MatLab® script. When the script is executed, the signal constellation of 1024 is generated in accordance with some embodiments. The signal constellation may be used to encode symbols by the master station 102 and/or HEW STAs 104. Listing the 1024 points on a signal figure with the corresponding bit representations may not be clear. The MatLab script 500 may be equivalent to listing the signal constellation itself with the bit labels. In some embodiments the master station 102 and/or HEW STA 104 may generate the signal constellation with a method similar or the same as script 500. In some embodiments the master station 102 and/or HEW STA 104 may store the signal constellation generated by the script 500.

Figure 6:
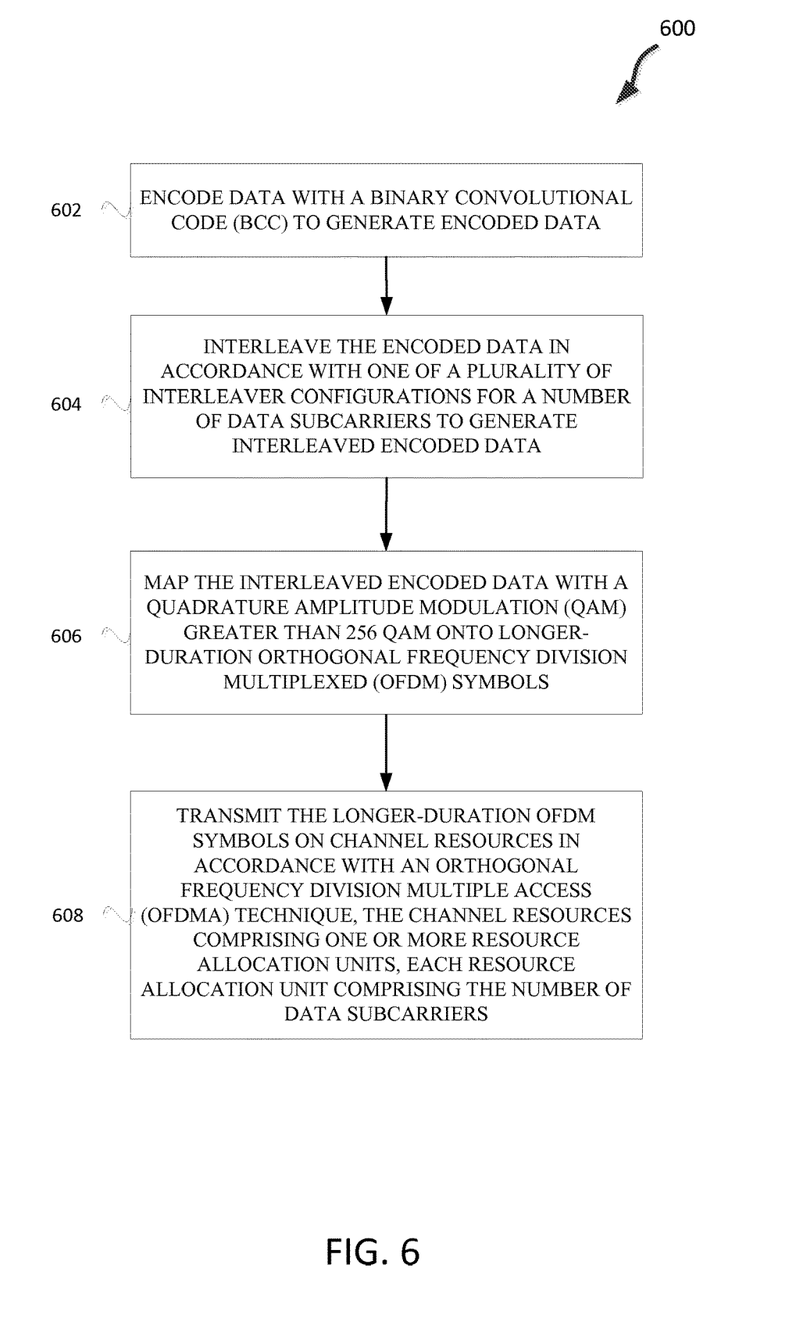
FIG. 6 illustrates a method for interleaving for higher QAM with longer duration symbols in a high efficiency wireless local-area network in accordance with some embodiments.

FIG. 6 illustrates a method 600 for interleaving for higher QAM with longer duration symbols in a high efficiency wireless local-area network in accordance with some embodiments. The method 600 begins at operation 602 with encoding data with a BCC to generate encoded data. For example, referring to FIG. 4, BCC encoder 408 may encode data from the BCC encoder parser 406. The BCC encoding may be based on an MCS such as is disclosed in conjunction with FIG. 3.

The method 600 continues at operation 604 with interleaving the encoded data in accordance with one of a plurality of interleaver configurations for one of a predetermined number of data subcarriers to generate interleaved encoded data. For example, referring to FIG. 4, the interleaver 414 may interleave encoded data from the segment parser 412 in accordance with a predetermined number of data subcarriers. A number of row and number of columns that determines how the BCC encoding is performed may be pre-determined based on simulations for best results in realistic communication settings.

The method 600 continues at operation 606 with mapping the interleaved encoded data with a QAM greater than 256 QAM onto longer-duration OFDM symbols. For example, referring to FIG. 4, the constellation mapper 416 may map the interleaved encoded data from the interleaver 414 onto a constellation map such is disclosed in conjunction with FIG. 5.

Figure 7:
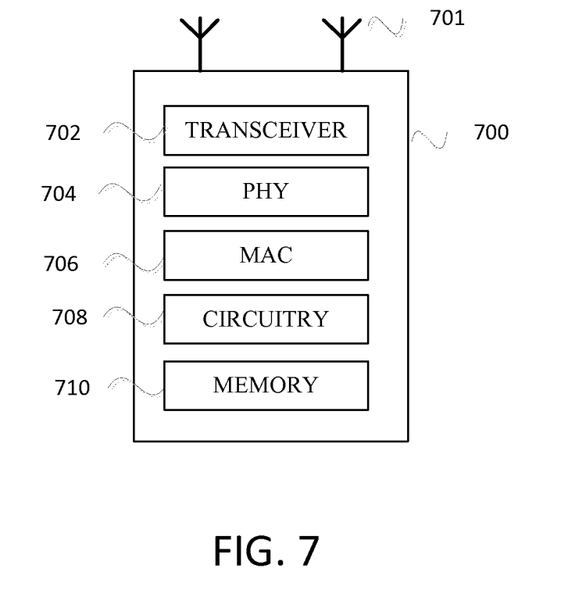
FIG. 7 illustrates a HEW station in accordance with some embodiments.

The method 600 continues at operation 608 with transmitting the longer-duration OFDM symbols on channel resources in accordance with an OFDMA technique, where the channel resources include one or more resource allocations and each resource allocation includes the one of the predetermined number of data subcarriers. For example, the HEW device 700 may transmit the longer-duration OFDM symbols in accordance with OFDMA. The method 700 may end.

FIG. 7 illustrates a HEW device 700 in accordance with some embodiments. HEW device 700 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 700 may be suitable for operating as master station 102 (FIG. 1) or a HEW STA 104 (FIG. 1). In accordance with embodiments, HEW device 700 may include, among other things, a transmit/receive element 701 (for example an antenna), a transceiver 702, physical (PHY) circuitry 704, and media access control (MAC) circuitry 706. PHY circuitry 704 and MAC circuitry 706 may be HEW compliant layers and may also be compliant with one or more legacy IEEE 802.13 standards. MAC circuitry 706 may be arranged to configure packets such as a physical layer convergence procedure (PLCP) protocol data unit (PPDUs) and arranged to transmit and receive PPDUs, among other things. HEW device 700 may also include circuitry 708 and memory 710 configured to perform the various operations described herein. The circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip.

In some embodiments, the MAC circuitry 706 may be arranged to contend for a wireless medium during a contention period to receive control of the medium for the HEW control period and configure an HEW PPDU. In some embodiments, the MAC circuitry 706 may be arranged to contend for the wireless medium based on channel contention settings, a transmitting power level, and a CCA level.

The PHY circuitry 704 may be arranged to transmit the HEW PPDU. The PHY circuitry 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. The circuitry 708 may include processing circuitry and/or transceiver circuitry in accordance with some embodiments. The circuitry 708 may include a processor such as a general purpose processor or special purpose processor. The circuitry 708 may implement one or more functions associated with transmit/receive elements 701, the transceiver 702, the PHY circuitry 704, the MAC circuitry 706, and/or the memory 710.

In some embodiments, the circuitry 708 may be configured to perform one or more of the functions and/or methods described herein and/or in conjunction with FIGS. 1-7.

In some embodiments, the transmit/receive elements 701 may be two or more antennas that may be coupled to the PHY circuitry 704 and arranged for sending and receiving signals including transmission of the HEW packets. The transceiver 702 may transmit and receive data such as HEW PPDU and packets that include an indication that the HEW device 700 should adapt the channel contention settings according to settings included in the packet. The memory 710 may store information for configuring the other circuitry to perform operations for configuring and transmitting HEW packets and performing the various operations to perform one or more of the functions and/or methods described herein and/or in conjunction with FIGS. 1-7.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 700 may use 4× symbol duration of 802.11n or 802.11ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 700 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a high-efficiency (HE) device comprising physical layer and medium access control layer circuitry to: encode data with a binary convolutional code (BCC) to generate encoded data, interleave the encoded data in accordance with one of a plurality of interleaver configurations for one of a predetermined number of data subcarriers to generate interleaved encoded data, map the interleaved encoded data with a quadrature amplitude modulation (QAM) greater than 256 QAM onto longer-duration orthogonal frequency division multiplexed (OFDM) symbols, and transmit the longer-duration OFDM symbols on channel resources in accordance with an orthogonal frequency division multiple access (OFDMA) technique. The channel resources may comprise one or more resource allocations, where each resource allocation may include one of the predetermined number of data subcarriers.

In Example 2, the subject matter of Example 1 can optionally include where the one of the predetermined number of data subcarriers for a 80 MHz resource allocation is 984 and the one of the plurality of interleaver configurations is one of the following: an interleaver configuration having 41 columns and one of 2, 3, 4, 6, 8, 12, or 24 rows, and an interleaver configuration having 82 columns and one of 2, 3, 4, 6, or 12 rows.

In Example 3, the subject matter of Example 1 or Example 2 can optionally include where the one of the plurality of predetermined number of data subcarriers is 48 and the one of the plurality of interleaver configurations is one of the following: an interleaver configuration having 12 columns and one of 2 or 4 rows; and an interleaver configuration having 16 columns and one of 3 rows.

In Example 4, the subject matter of any of Examples 1-3 can optionally include where the one of the plurality of predetermined number of data subcarriers is 24 and the one of the plurality of interleaver configurations is an interleaver configuration having 8 columns and 2 rows.

In Example 5, the subject matter of any of Examples 1-4 can optionally include where the one of the plurality of predetermined number of data subcarriers is 102 and the one of the plurality of interleaver configurations is an interleaver configuration having 17 columns and one of 2, 3 or 6 rows.

In Example 6, the subject matter of any of Examples 1-5 can optionally include where the one of the plurality of predetermined number of data subcarriers is 468 and the one of the plurality of interleaver configurations is one of the following: an interleaver configuration having 26 columns and one of 2, 3, 6, 9, or 18 rows, an interleaver configuration having 36 columns and 13 rows, and an interleaver configuration having 52 columns and one of 3 or 9 rows.

In Example 7, the subject matter of any of Examples 1-6 can optionally include where the longer-duration OFDM symbols have a symbol duration that is four-times as long (4×) as a standard OFDM symbol duration.

In Example 8, the subject matter of Examples 7 can optionally include where the standard-duration OFDM symbols have a symbol duration that ranges from 3.6 microseconds (us) including a 400 nanosecond (ns) short guard interval to 4 us including an 800 ns guard interval.

In Example 9, the subject matter of any of Examples 1-8 can optionally include where the physical layer and medium access control layer circuitry is further configured to transmit the longer-duration OFDM symbols on the subcarrier allocation in accordance with the OFDMA technique and in accordance with a multi-user multiple-input multiple-output (MU-MIMO) technique.

In Example 10, the subject matter of any of Examples 1-9 can optionally include where the physical-layer circuitry includes a block interleaver having a depth of one OFDM symbol, and the block interleaver is configured to interleave a block of encoded data in accordance with the one of a plurality of interleaver configurations, and where the one of the plurality of interleaver configurations comprises a number of columns and a number of rows.

In Example 11, the subject matter of Examples 11 can optionally include where the apparatus further includes an encoder to perform the BCC encoding on data prior to interleaving in accordance with one of a plurality of code rates, and a constellation mapper to map the interleaved encoded data to the greater than 256 QAM constellation, where the encoder and mapper operate in accordance with one of a plurality of predetermined modulation and coding scheme (MCS) combinations for the subcarrier allocation, and where the plurality of predetermined MCS combinations for the subcarrier allocation are restricted to an integer number of coded bits per OFDM symbol (Ncbps) and an integer number of data bits per OFDM symbol (Ndbps).

In Example 12, the subject matter of any of Examples 1-11 can optionally include where the physical layer and medium access control layer circuitry are further configured to select the one of the plurality of interleaver configurations based on the one of the predetermined number of data subcarriers.

In Example 13, the subject matter of any of Examples 1-12 can optionally include where the HEW device is at least one from the following group a HEW station, a master station, an Institute of Electrical and Electronic Engineers (IEEE) 802.11ax access point, and an IEEE 802.11ax station.

In Example 14, the subject matter of any of Examples 1-13 can optionally include where the physical layer and medium access control layer circuitry are further configured to map the longer-duration OFDM symbols to a signal constellation that comprises 1024 points, the 1024 points being the intersection of first lines parallel to a vertical axis, the first lines to intersect a horizontal axis at points $-31, -29, -25, -27, -17, -19, -23, -21, -1, -3, -7, -5, -15, -13, -9, -11, 31, 29, 25, 27, 17, 19, 23, 21, 1, 3, 7, 5, 15, 13, 9,$ and $11$; and, a second lines parallel to the horizontal axis, the second lines to intersect the vertical axis at points $-31, -29, -25, -27, -17, -19, -23, -21, -1, -3, -7, -5, -15, -13, -9, -11, 31, 29, 25, 27, 17, 19, 23, 21, 1, 3, 7, 5, 15, 13, 9,$ and $11$.

In Example 15, the subject matter of any of Examples 1-14 can optionally include where the apparatus further comprises memory coupled to the physical layer and medium access control layer circuitry, and one or more antennas coupled to the physical layer and medium access control layer circuitry.

Example 16 is a non-transitory computer-readable storage medium that stores instructions for execution by one or more processors. The instructions to configure the one or more processors to cause a high-efficiency wireless local-area network (HEW) device to encode data with a binary convolutional code (BCC) to generate encoded data, and interleave the encoded data in accordance with one of a plurality of interleaver configurations for one of a predetermined number of data subcarriers to generate interleaved encoded data. The instructions further to map the interleaved encoded data with a quadrature amplitude modulation (QAM) greater than 256 QAM onto longer-duration orthogonal frequency division multiplexed (OFDM) symbols, and transmit the longer-duration OFDM symbols on channel resources in accordance with an orthogonal frequency division multiple access (OFDMA) technique, the channel resources comprising one or more resource allocations, each resource allocation comprising one of a predetermined number of data subcarriers.

In Example 17, the subject matter of Example 16 can optionally include where the one of the plurality of interleaver configurations is one of the following: an interleaver configuration having 41 columns and one of 2, 3, 4, 6, 8, 12, or 24 rows, if the one of the predetermined number of data subcarriers is 984; an interleaver configuration having 82 columns and one of 2, 3, 4, 6, or 12 rows, if the one of the predetermined number of data subcarriers is 984; an interleaver configuration having 12 or 16 columns if the one of the predetermined number of data subcarriers is 48; an interleaver configuration having 8 columns and 2 rows if the one of the predetermined number of data subcarriers is 24; an interleaver configuration having 26 or 36 columns and one of 2, 3, 6, 9, or 18 rows if the one of the predetermined number of data subcarriers is 468; and an interleaver configuration having 52 columns and one of 3 or 9 rows if the one of the predetermined number of data subcarriers is 468.

In Example 18, the subject matter of Examples 16 or 17 can optionally include where the longer-duration OFDM symbols have a symbol duration that is four-times as long (4×) as a standard OFDM symbol duration.

In Example 19, the subject matter of any of Examples 16-18 can optionally include where the method further includes encoding data with a binary convolutional code (BCC) to generate encoded data, interleaving the encoded data in accordance with one of a plurality of interleaver configurations for one of a predetermined number of data subcarriers to generate interleaved encoded data, and mapping the interleaved encoded data with a quadrature amplitude modulation (QAM) greater than 256 QAM onto longer-duration orthogonal frequency division multiplexed (OFDM) symbols. The method may further include transmitting the longer-duration OFDM symbols on channel resources in accordance with an orthogonal frequency division multiple access (OFDMA) technique, where the channel resources include one or more resource allocations, each resource allocation comprising one of a plurality of predetermined number of data subcarriers.

In Example 20, the subject matter of Example 19 can optionally include where the one of the plurality of interleaver configurations is one of the following: an interleaver configuration having 41 columns and one of 2, 3, 4, 6, 8, 12, or 24 rows, if the one of the predetermined number of data subcarriers is 984; an interleaver configuration having 82 columns and one of 2, 3, 4, 6, or 12 rows, if the one of the predetermined number of data subcarriers is 984; an interleaver configuration having 12 or 16 columns if the one of the predetermined number of data subcarriers is 48; an interleaver configuration having 8 columns and 2 rows if the one of the predetermined number of data subcarriers is 24; an interleaver configuration having 26 or 36 columns and one of 2, 3, 6, 9, or 18 rows if the one of the predetermined number of data subcarriers is 468; and an interleaver configuration having 52 columns and one of 3 or 9 rows if the one of the predetermined number of data subcarriers is 468, and wherein the longer-duration OFDM symbols have a symbol duration that is four-times as long (4×) as a standard OFDM symbol duration.

Example 21 is an apparatus of a high-efficiency (HE) device. The apparatus including means for encoding data with a binary convolutional code (BCC) to generate encoded data, means for interleaving the encoded data in accordance with one of a plurality of interleaver configurations for one of a predetermined number of data subcarriers to generate interleaved encoded data, and means for mapping the interleaved encoded data with a quadrature amplitude modulation (QAM) greater than 256 QAM onto longer-duration orthogonal frequency division multiplexed (OFDM) symbols. The apparatus may further include means for transmitting the longer-duration OFDM symbols on channel resources in accordance with an orthogonal frequency division multiple access (OFDMA) technique, where the channel resources comprising one or more resource allocations, each resource allocation comprising the one of the plurality of predetermined number of data subcarriers.

In Example 22, the subject matter of Example 22 can optionally include where the one of the plurality of predetermined number of data subcarriers for a 80 MHz resource allocation is 984 and the one of the plurality of interleaver configurations is one of the following: an interleaver configuration having 41 columns and one of 2, 3, 4, 6, 8, 12, or 24 rows; and an interleaver configuration having 82 columns and one of 2, 3, 4, 6, or 12 rows.

In Example 23, the subject matter of any Examples 21 or 22 can optionally include where the one of the plurality of predetermined number of data subcarriers is 48 and the one of the plurality of interleaver configurations is one of the following: an interleaver configuration having 12 columns and one of 2 or 4 rows; and an interleaver configuration having 16 columns and one of 3 rows.

In Example 24, the subject matter of any of Examples 21-23 can optionally include where the one of the plurality of predetermined number of data subcarriers is 24 and the one of the plurality of interleaver configurations is an interleaver configuration having 8 columns and 2 rows.

In Example 25, the subject matter of any of Examples 21-24 can optionally include where the one of the plurality of predetermined number of data subcarriers is 102 and the one of the plurality of interleaver configurations is an interleaver configuration having 17 columns and one of 2, 3 or 6 rows.

In Example 26, the subject matter of any of Examples 21-25 can optionally include where the one of the plurality of predetermined number of data subcarriers is 468 and the one of the plurality of interleaver configurations is one of the following: an interleaver configuration having 26 columns and one of 2, 3, 6, 9, or 18 rows; an interleaver configuration having 36 columns and 13 rows; and an interleaver configuration having 52 columns and one of 3 or 9 rows.

In Example 27, the subject matter of any of Examples 21-26 can optionally include where the longer-duration OFDM symbols have a symbol duration that is four-times as long (4×) as a standard OFDM symbol duration.

In Example 28, the subject matter of Example 27 can optionally include where the standard-duration OFDM symbols have a symbol duration that ranges from 3.6 microseconds (us) including a 400 nanosecond (ns) short guard interval to 4 us including an 800 ns guard interval.

In Example 29, the subject matter of any of Examples 21-28 can optionally include where the apparatus further comprises: means for transmitting the longer-duration OFDM symbols on the subcarrier allocation in accordance with the OFDMA technique and in accordance with a multi-user multiple-input multiple-output (MU-MIMO) technique.

In Example 30, the subject matter of any of Examples 21-29 can optionally include where the apparatus includes means for a block interleaver having a depth of one OFDM symbol, where the block interleaver being configured to interleave a block of encoded data in accordance with the one of a plurality of interleaver configurations, and where the one of the plurality of interleaver configurations comprises a number of columns and a number of rows.

In Example 31, the subject matter of Examples 30 can optionally include where the apparatus includes means for an encoder to perform the BCC encoding on data prior to interleaving in accordance with one of a plurality of code rates; and means for a constellation mapper to map the interleaved encoded data to the greater than 256 QAM constellation, where the encoder and mapper operate in accordance with one of a plurality of predetermined modulation and coding scheme (MCS) combinations for the subcarrier allocation, and where the plurality of predetermined MCS combinations for the subcarrier allocation are restricted to an integer number of coded bits per OFDM symbol (Ncbps) and an integer number of data bits per OFDM symbol (Ndbps).

In Example 32, the subject matter of any of Examples 21-31 can optionally include where the apparatus further includes means for selecting the one of the plurality of interleaver configurations based on the one of the predetermined number of data subcarriers.

In Example 33, the subject matter of any of Examples 21-32 can optionally include where the HEW device is at least one from the following group a HEW station, a master station, an Institute of Electrical and Electronic Engineers (IEEE) 802.11ax access point, and an IEEE 802.11ax station.

In Example 34, the subject matter of any of Examples 21-33 can optionally include where the apparatus further includes means for mapping the longer-duration OFDM symbols to a signal constellation that comprises 1024 points, the 1024 points being the intersection of first lines parallel to a vertical axis, the first lines to intersect a horizontal axis at points −31, −29, −25, −27, −17, −19, −23, −21, −1, −3, −7, −5, −15, −13, −9, −11, 31, 29, 25, 27, 17, 19, 23, 21, 1, 3, 7, 5, 15, 13, 9, and 11; and, a second lines parallel to the horizontal axis, the second lines to intersect the vertical axis at points −31, −29, −25, −27, −17, −19, −23, −21, −1, −3, −7, −5, −15, −13, −9, −11, 31, 29, 25, 27, 17, 19, 23, 21, 1, 3, 7, 5, 15, 13, 9, and 11.

In Example 35, the subject matter of any of Examples 21-34 can optionally include where the apparatus includes means for storing and retrieving OFDM symbols, and means for sending and receiving signals in accordance with Institute of Electrical and Electronic Engineers (IEEE) 802.11.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) device comprising physical layer and medium access control layer circuitry to:
    encode data with a binary' convolutional code (BCC) to generate encoded data;
    interleave the encoded data in accordance with one of a plurality of interleaver configurations for one of a plurality of predetermined number of data subcarriers to generate interleaved encoded data, wherein the one of the plurality of predetermined number of data subcarriers is 24 and the one of the plurality of interleaver configurations is an interleaver configuration having 8 columns and 2 rows:
    map the interleaved encoded data with a quadrature amplitude modulation (QAM) greater than 256 QAM onto longer-duration orthogonal frequency division multiplexed (OFDM) symbols; and
    transmit the longer-duration OFDM symbols on channel resources in accordance with an orthogonal frequency division multiple access (OFDMA) technique, the channel resources comprising one or more resource allocations, each resource allocation comprising the one of the plurality of predetermined number of data subcarriers.

2. The apparatus of claim 1, wherein the longer-duration OFDM: symbols have a symbol duration that is four-times as long (4×) as a standard OFDM symbol duration.

3. The apparatus of claim 2, wherein the standard-duration OFDM symbols have a symbol duration that ranges from 3.6 micro-seconds (us) including a 400 nanosecond (ns) short guard interval to 4 us including an 800 ns guard interval.

4. The apparatus of claim 1, wherein the physical layer and medium access control layer circuitry is further configured to transmit the longer-duration OFDM symbols on the subcarrier allocation in accordance with the OFDMA technique and in accordance with a multi-user multiple-input multiple-output (MU-MIMO) technique.

5. The apparatus of claim 1, wherein the physical-layer circuitry includes a block interleaver having a depth of one OFDM symbol, the block interleaver being configured to interleave a block of encoded data in accordance with the one of a plurality of interleaver configurations, wherein the one of the plurality of interleaver configurations comprises a number of columns and a number of rows.

6. The apparatus of claim 5, wherein the apparatus further comprises:
    an encoder to perform the BCC encoding on data prior to interleaving in accordance with one of a plurality of code rates; and
    a constellation mapper to map the interleaved encoded data to the greater than 256 QAM constellation,
    wherein the encoder and mapper operate in accordance with one of a plurality of predetermined modulation and coding scheme (MCS) combinations for the subcarrier allocation,
    wherein the plurality of predetermined MCS combinations for the subcarrier allocation
    are restricted to an integer number of coded bits per OFDM symbol (Ncbps) and an integer number of data bits per OFDM symbol (Ndbps).

7. The apparatus of claim 1, wherein the physical layer and medium access control layer circuitry are further configured to select the one of the plurality of interleaver configurations based on the one of the predetermined number of data subcarriers.

8. The apparatus of claim 1, wherein the FEW device is at least one from the following group: a HEW station, a master station, an Institute of Electrical and Electronic Engineers (IEEE) 802.11ax access point, and an IEEE 802.11ax station.

9. The apparatus of claim 1, wherein the physical layer and medium access control layer circuitry are further configured to map the longer-duration OFDM: symbols to a signal constellation that comprises 1024 points, the 1024 points being the intersection of first lines parallel to a vertical axis, the first lines to intersect a horizontal axis at points −31, −29, −25, −27, −17, −19, −23, −21, −1, −3, −7, −5, −15, −13, −9, −11, 31, 29, 25, 27, 17, 19, 23, 21, 1, 3, 7, 5, 15, 13, 9, and 11; and, a second lines parallel to the horizontal axis, the second lines to intersect the vertical axis at points −31, −29, −25, −27, −17, −19, −23, −21, −1, −3, −7, −5, −15, −13, −9, −11, 31, 29, 25, 27, 17, 19, 23, 21, 1, 3, 7, 5, 15, 13, 9, and 11, wherein the horizontal axis is a real or in-phase axis and the vertical axis is an imaginary 7 or quadrature axis.

10. The apparatus of claim 1, wherein the apparatus further comprises: memory coupled to the physical layer and medium access control layer circuitry; and, one or more antennas coupled to the physical layer and medium access control layer circuitry.

11. A non-transitory computer-readable storage medium that stores instructions for execution by one or more processors, the instructions to configure the one or more processors to cause a high-efficiency wireless local-area network (HEW) device to:
  encode data with a binary convolutional code (BCC) to generate encoded data;
  interleave the encoded data in accordance with one of a plurality of interleaver configurations for one of a plurality of predetermined number of data subcarriers to generate interleaved encoded data, wherein the one of the plurality of predetermined number of data subcarriers is 24 and the one of the plurality of interleaver configurations is an interleaver configuration having 8 columns and 2 rows:
  map the interleaved encoded data with a quadrature amplitude modulation (QAM) greater than 256 QAM onto longer-duration orthogonal frequency division multiplexed (OFDM) symbols; and
  transmit the longer-duration OFDM symbols on channel resources in accordance with an orthogonal frequency division multiple access (OFDMA) technique, the channel resources comprising one or more resource allocations, each resource allocation comprising the one of the plurality of predetermined number of data subcarriers.

12. The non-transitory computer-readable storage medium of claim 11, wherein the longer-duration OFDM symbols have a symbol duration that is four-times as long (4×) as a standard OFDM symbol duration.

13. A method performed by a high-efficiency wireless local-area network (HEW) device, the method comprising:
  encoding data with a binary convolutional code (BCC) to generate encoded data;
  interleaving the encoded data in accordance with one of a plurality of interleaver configurations for one of a plurality of predetermined number of data subcarriers to generate interleaved encoded data, wherein the one of the plurality of predetermined number of data subcarriers is 24 and the one of the plurality of interleaver configurations is an interleaver configuration having 8 columns and 2 rows:
  mapping the interleaved encoded data with a quadrature amplitude modulation (QAM) greater than 256 QAM onto longer-duration orthogonal frequency division multiplexed (OFDM) symbols; and
  transmitting the longer-duration OFDM symbols on channel resources in accordance with an orthogonal frequency division multiple access (OFDMA) technique, the channel resources comprising one or more resource allocations, each resource allocation comprising the one of the plurality of predetermined number of data subcarriers.

\* \* \* \* \*